(No Model.)
R. BIRKHOLZ.
DESICCATING APPARATUS.
No. 451,395. Patented Apr. 28, 1891.
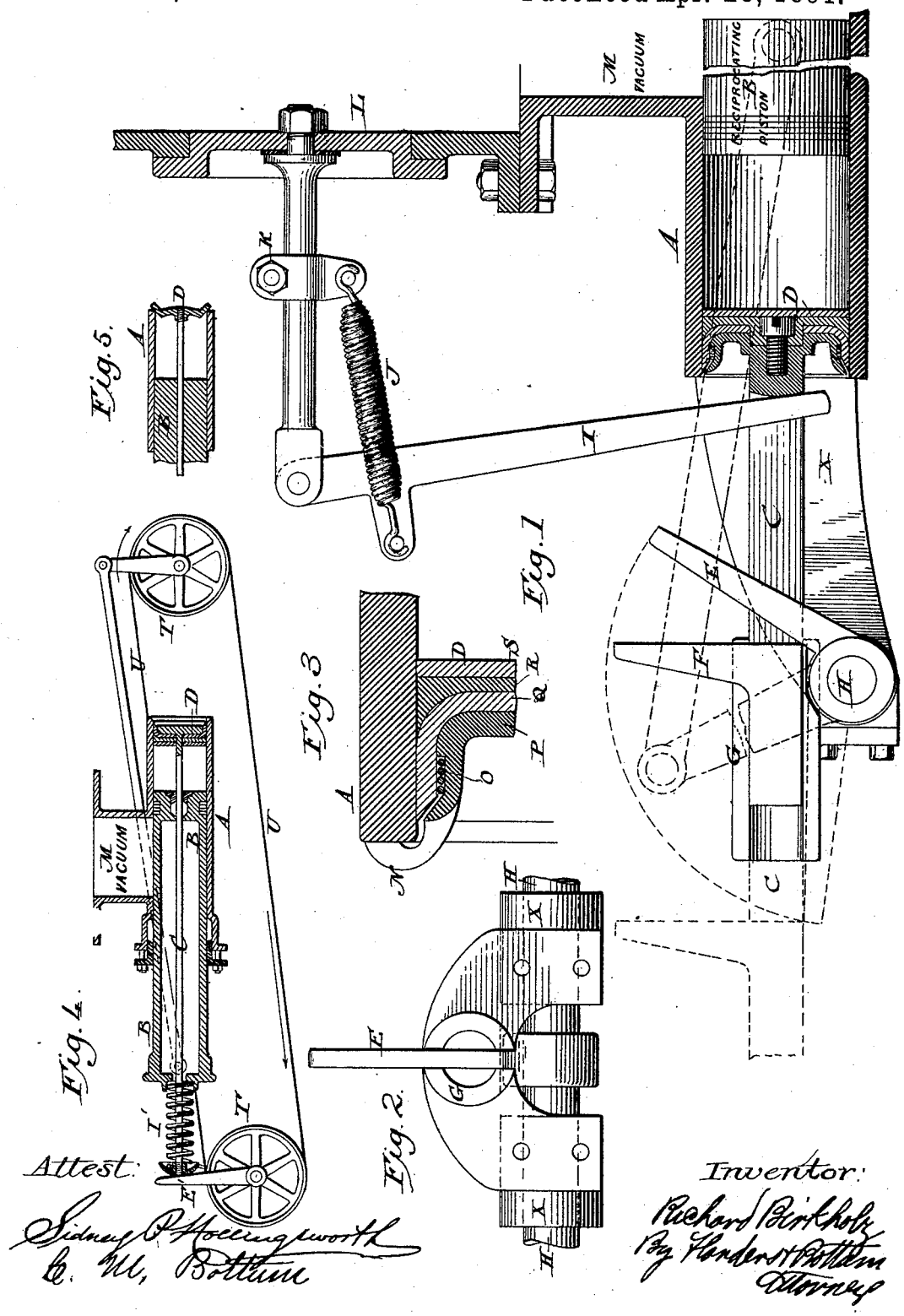

UNITED STATES PATENT OFFICE.

RICHARD BIRKHOLZ, OF MILWAUKEE, WISCONSIN, ASSIGNOR TO THE ECONOMY DRYER COMPANY, OF SAME PLACE.

DESICCATING APPARATUS.

SPECIFICATION forming part of Letters Patent No. 451,395, dated April 28, 1891.

Application filed May 16, 1888. Serial No. 274,103. (No model.)

*To all whom it may concern:*

Be it known that I, RICHARD BIRKHOLZ, a citizen of the United States, residing at Milwaukee, in the county of Milwaukee and State of Wisconsin, have invented certain new and useful Improvements in Desiccating Apparatus; and I do hereby declare the following to be a full, clear, and exact description of the invention, such as will enable others skilled in the art to which it appertains to make and use the same.

My invention relates to an apparatus for desiccation *in vacuo*; and its object is to effect the discharge of the dried material without interfering with the vacuum.

It consists of means for effecting such discharge.

In the accompanying drawings like letters are used to denote similar parts.

Figure 1 is a vertical longitudinal section of my device through the center of the cylinder. Fig. 2 is an end elevation of the end at the left of Fig. 1. Fig. 3 is a section of part of the valve D in Fig. 1. Fig. 4 is a vertical longitudinal section of my device, slightly modified in arrangement and construction, and Fig. 5 is a modification of the valve itself.

A is a cylinder, communicating near its center with a hopper or receptacle M within the vacuum.

B is a piston, caused to reciprocate therein by means of a crank on a shaft H and a connecting-rod from the crank to the outer or right-hand end of piston B, which is represented as broken away, and the connection, which is obvious, is not shown.

C is a valve-stem, and D a valve serving to plug the end of the cylinder A and prevent the passage of air, as hereinafter explained. The valve-stem C slides in slotted ways or cheek-pieces *g*, which guide it in the axial line of the cylinder A.

F is a thumb-piece fastened to stem C, by means of which the stem is reciprocated.

H is a shaft mounted in the yoke *x*, which is firmly bolted to cylinder A or other firm base.

I is a spring-retracted lever pivoted at its upper end to a stud affixed to the machine-frame or other solid support L.

K is an ear clamped by a set-screw or bolt upon the stud, to which it is represented as attached, provided with a pin for the engagement of spring J, which is also hooked over a pin in lever I. The spring J therefore pulls upon the lever I and presses the valve D home. The ear K is made adjustable to vary the pressure of lever I.

E is the cam-finger keyed to the shaft H.

The end of the cylinder A (not shown) is provided with a stuffing-box, and the piston B is a plug-piston, (or cylindrical,) and may be made hollow and provided with annular packing at its extremity.

The valve D is composed of two sections P and R, of iron or other suitable material, and a capped packing Q, of leather, vulcanized fiber, or other suitable material, and a circular packing or face S on its inner surface, of leather or other suitable material. A helical coiled spring O serves to expand the packing Q. As constructed in the drawings, the shaft H should turn to the left in use, the dotted lines showing the movement of the valve-stem C, thumb F, and finger E.

N is one of two hooks placed diametrically opposite on valve D and securely fastened to it for the purpose of preventing the valve D from entering the cylinder too far.

Instead of constructing the parts in the way shown in Figs. 1, 2, and 3, I may connect the valve D to a stem, which passes through a suitable stuffing-box in the piston, which guides it, and provide it with a spring I'. The wheels T T would then be used connected with a chain belt or other means, and to the shaft of one a cam-finger could be keyed and used to force out the valve, the spring I' serving to reseat it.

U is the connecting-rod which serves to move piston B, and the construction of the piston B, cylinder A, and hopper M would, if shown complete in Fig. 1, be the same as in Fig. 4.

Instead of constructing the valve as before described, I may vary its construction, as shown in Fig. 5, where a bevel-faced valve acting against an angular edge is shown. The effect of the bevel and angular edge is to prevent the adhesion of dust or desiccated material, which by its adhesion would interfere with the close fit of the valve and the preservation of the vacuum.

My invention operates as follows: When the piston B is withdrawn by the revolution of shaft H through any suitable power connection, the dried material ready to be discharged falls into the cylinder A in front of the piston B. As the piston is reversed it pushes the material in the cylinder out toward the valve D, which is retracted by means of cam-finger E acting on the thumb-piece F, which is attached to stem C. The movements of piston B and finger E should be so timed by the relative positions in which they are keyed on shaft H that after the piston B has securely closed the opening into chamber M and the material is pressed against the valve D the valve D should move faster than the piston B, and the intervening material freed from pressure will drop readily. The travel of the piston and valve should be about the same, the travel of the valve being preferably a little greater than that of the piston. When the valve is released by the cam-finger, it will be suddenly seated by the action of spring-arm I. The leather facing S will prevent injurious impact with the piston. A repetition of the movement of the piston effects another discharge of material, the operation being practically continuous.

Having thus described my invention, I claim—

1. In a discharging device for vacuum driers, the combination, with a closed chamber, of a cylinder communicating therewith through an opening in one side and having an open end, a reciprocating piston adapted to said cylinder and arranged in its advance movement to close the opening into the vacuum-chamber, a valve normally closing the discharge end of said cylinder and movable in the direction of the axial line of the cylinder, and mechanism arranged to open said valve for the discharge of material from the cylinder when the piston advances and closes the opening into the vacuum-chamber and to close the valve before the piston clears said opening in its reverse movement, substantially as and for the purposes set forth.

2. In a discharging device for vacuum driers, the combination, with a closed chamber, of an open-ended cylinder communicating therewith through an opening in one side, a reciprocating piston adapted to said cylinder and arranged to close said opening in its advance movement, a valve normally closing the discharge end of said cylinder and movable in the direction of the axial line thereof, and mechanism arranged to open said valve when the piston advances and closes the opening into the vacuum-chamber and to close said valve before the piston clears said opening in its reverse movement, the movement of said valve in opening being faster than that of the piston, so as to release the material between them and facilitate its discharge, substantially as and for the purposes set forth.

3. In a discharging device for vacuum driers, the combination, with a closed chamber, of a cylinder communicating therewith through an opening in one side and having an open end, a piston adapted to said cylinder, a crank connected with and arranged to reciprocate said piston, a valve normally closing the discharge end of said cylinder, and a cam-finger arranged to engage with a thumb-piece on the valve-stem and to open said valve when the piston advances and closes the opening into the vacuum-chamber, the movement of said valve in opening being faster than the advance of said piston, substantially as and for the purposes set forth.

4. In a vacuum drying apparatus, the combination, with a closed vacuum-chamber, of an open-ended cylinder communicating therewith through an opening in one side, a piston adapted to said cylinder and arranged to pass over and close said opening in its advance movement, a valve normally closing the discharge end of the cylinder and movable in the direction of its axis, a crank connected with and arranged to reciprocate said piston, a cam-arm arranged to engage with a thumb-piece on the stem of said valve and to open the same when the piston advances and closes the opening into the vacuum-chamber, and a spring-actuated arm arranged to close said valve as the piston is withdrawn, substantially as and for the purposes set forth.

In testimony whereof I affix my signature in presence of two witnesses.

RICHARD BIRKHOLZ.

Witnesses:
E. H. BOTTUM,
GEO. G. COLEGATE.